Jan. 18, 1927.
J. C. DE PENNING
1,614,720
METHOD OF FORMING STRIPS
Filed May 27, 1926
2 Sheets-Sheet 1
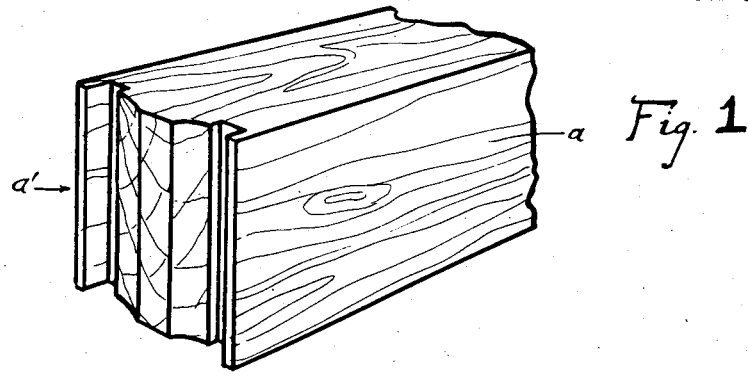
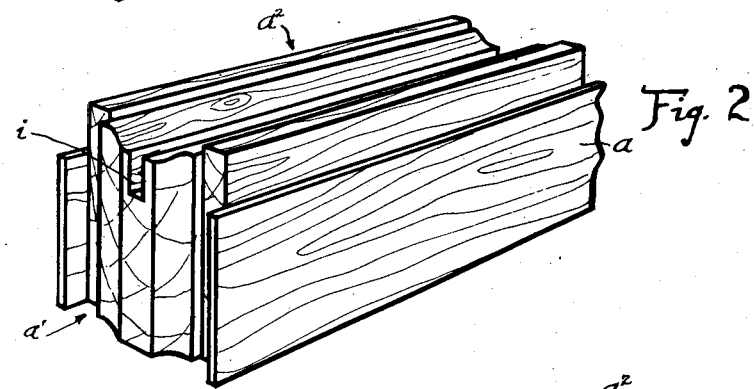
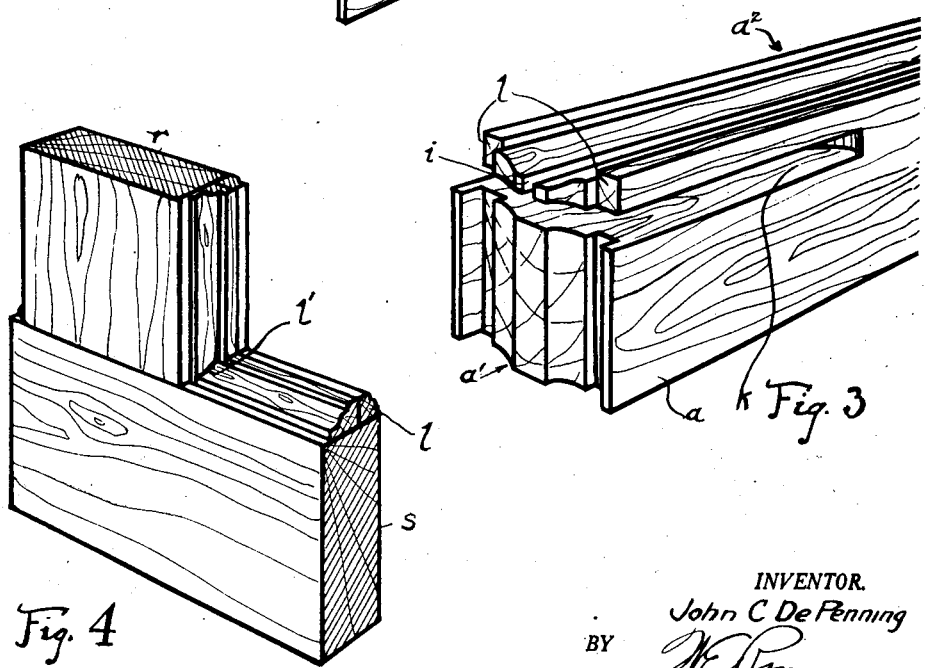
INVENTOR.
John C De Penning
BY
ATTORNEY INVENTOR.
John C De Penning
BY
ATTORNEY Patented Jan. 18, 1927.

1,614,720

UNITED STATES PATENT OFFICE.

JOHN C. DE PENNING, OF PORTLAND, OREGON.

METHOD OF FORMING STRIPS.

Application filed May 27, 1926. Serial No. 112,065.

My invention relates to the art of woodworking, and has for its particular object, the provision of an efficient method of forming strips of molding, door stops and the like from blocks of material by which the entire strip may be formed and finished, its ends as well as its surfaces, while said strip constitutes an integral portion of said block and thus while rigidly supported by the same.

It is common practice at the present time to form molding and similar strips from roughly finished strips of material of substantially the same proportion and outline as that of the finished strips, and to feed said strips of rough material in relatively long lengths to a "sticker". The finished strip must be cut into proper lengths and if the ends thereof are to be finished other than to be mitered smoothly, a difficult problem is presented, because of the relatively small size and the fragility of said strips.

It has long been appreciated, for example, that door stops and other types of molding, making up interior frames, could be assembled more quickly and with neater and less easily detected joints, by coping the ends of two opposite pieces of a rectangular frame and squaring the ends of the remaining two pieces instead of mitering the ends of all of them. By coping, I mean the forming of the ends of certain strips so that they will match exactly the profile of the strips which they overlie and with which profile said ends abut.

It is an exceedingly difficult operation to cope or otherwise finish the ends of said molding or said stops, when the latter are in strips and thus this admittedly better joint is not utilized except on high class work, where the fitting can be made by careful hand work, because the difficulty of performing this operation makes it a great deal more expensive.

I have discovered that short lengths of molding and like strips can be finished on their ends as well as on their faces, by forming said strips in predetermined lengths upon one edge of a block of material of substantially greater dimensions and then sawing off from said finished edge a strip of proper thickness. The remainder of the block of material may easily be gripped without injuring the finished edge and, because of its larger size, will not twist or become broken.

In the manufacture of wooden doors, I have further discovered that by this method, I can utilize the trimmings from the stiles as $s$, in the drawings, and rails $r$ to make door stops and in this way effect a substantial saving of material, which material would otherwise be considered scrap and would be discarded. Said short pieces of trimmings are cut to the desired length and their ends finished and then one edge is profiled, and a strip carrying said profile is cut from the latter edge.

Because of the relative thickness of the stiles and rails as compared to that of said stops I preferably outline two stops side by side, on the edge of said block of material, and when removing said stops from the remainder of said block, I also cut said two strips apart.

The blocks of material used are substantially of greater width than the strips to be cut therefrom, and thus the edge of each of said blocks can be profiled successively a number of times to produce a corresponding number of strips.

The details of my improved method of forming strips of material, is hereinafter, described in greater detail and illustrated in the accompanying drawings, in which:

Fig. 1 is a fragmentary perspective view of one end of a block of material from which a strip of molding is to be produced, said block being cut to exact length and the ends thereof, coped;

Fig. 2 is a similar fragmentary perspective view of the same end of said block of material and one edge thereof, this view showing a successive step in the formation of a door stop, by my improved method, in that the edge has been profiled to outline two strips arranged side by side, but while still constituting an integral part of said block;

Fig. 3 is a similar fragmentary perspective view of a still further step of my improved method, said further step being the forming of a saw cut by which the formed edge is removed in strips;

Fig. 4 is a similar fragmentary perspective view of one corner of a frame made with door stops thus formed showing a coped joint;

A block of material $a$ used to form said strips is preferably of such thickness as will produce one or more strips upon the edge thereof, without excessive waste. In the accompanying drawing, I have shown a block which is of sufficient thickness to produce two strips arranged side by side upon its edge. Said block of material $a$, is first cut to a predetermined length and one end $a'$ thereof is finished either by a cope, miter, or other type of finish, as shown in Fig. 1, or by being neatly squared, that depending entirely upon the position which said strip will assume when constituting a frame.

The block with its ends finished in any of these manners, is then profiled, as shown in Fig. 2, so that one edge $a^2$ thereof, carries an outline of one or more strips finished on all sides but one. Said remaining side, unfinished, is that one facing the remainder of the block, said strips during this operation are as yet attached to the remainder, forming an integral portion thereof, thus permitting said operation to be performed while devices grip the remainder of the block and thus do not injure the finished faces of the strip.

Figure 5:
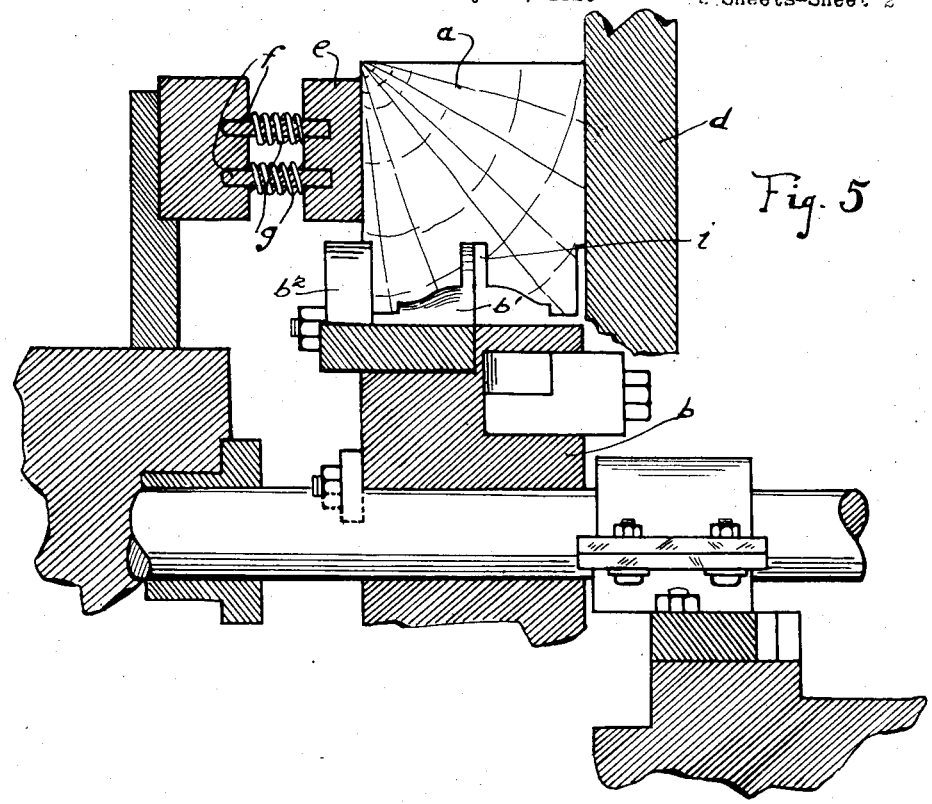
Fig. 5 is a fragmentary elevation showing a portion of the devices used in profiling the edge of said block and the holding devices for the latter.
Figure 6:
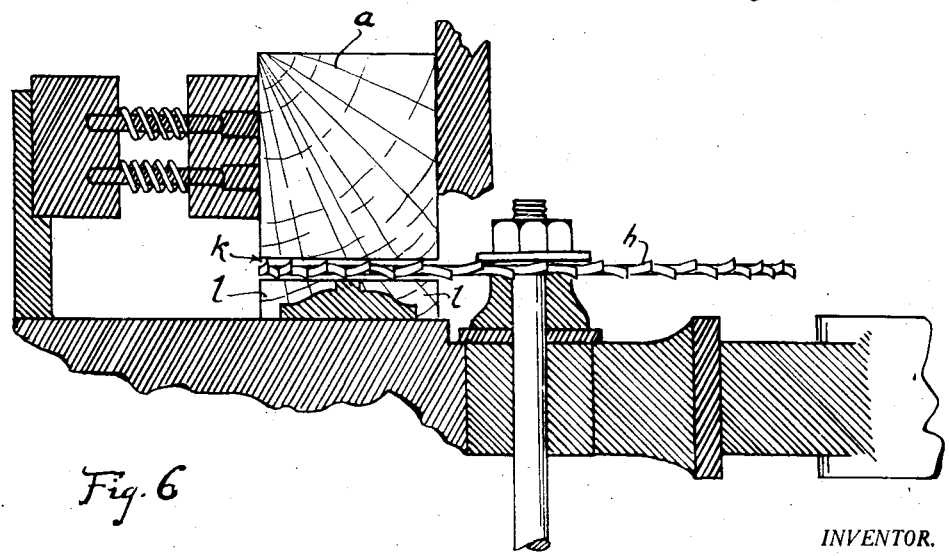
Fig. 6 is a similar elevation of the devices for cutting strips from the block to form the door stops or other molding, and the holding and guiding for such strips and for the remainder of the block.

The profiling is preferably accomplished by moving said block of material $a$, so that its edge $a^2$ passes by a profiling or sticker head $b$, as shown in Fig. 5. The block of material $a$ is moved along the surface of a table or frame $c$ and is aligned with the rotary profiling or sticker head $b$, by means of a vertical wall $d$ and a spring extended head $e$. Said head preferably is slidably mounted upon pins $f$ and held in yielding engaging position with the block of material $a$, as by coiled springs $g$.

The profiling or sticker head is preferably provided with detachable blades, one set $b'$ thereof finishing the faces and one edge of the two aligned strips of molding formed upon the edge $a^2$ of said block, and a second set $b^2$ finishing the other edge thereof, as shown in Fig. 5.

I then move the block of material $a$ with the edge thus finished past a rotatable saw $h$, so that the latter may cut off a strip of molding or door stopping of desired thickness.

If more than one strip is formed upon the edge of the block of material as is shown in the accompanying drawings, I form a longitudinal slot $i$ between the strips and thus when the saw $h$ forms the kerf $k$ it will intersect said slot and sever said strips $l$ from each other as well as from the remainder of the block.

I am not describing the details of my improved machine for performing the larger part of the operations upon said strips in this application, inasmuch as I am covering the details thereof in a co-pending application entitled Strip forming machine filed June 1, 1926; Serial No. 112,984.

In Fig. 4 I have shown, substantially diagrammatic, an interior corner made of molding or door stops formed by my improved method. It is to be noted that a frame made in this manner has corners which overlie each other to a certain degree, and thus slight imperfections in workmanship are not readily apparent, because they are concealed somewhat in the joint. Thus, for example, if the strips of molding or door stopping $l$ were a little short, said defect will be concealed by the ends of the coped strip $l'$. In door stopping made with the mitered ends, however, a slight difference in length would result in the very obvious defect.

In the manufacture of wooden doors, I have discovered that my improved method, as outlined, may effect an unusual saving, thus throughout this application I have noted said strips as door stops, as the particular type of molding with which my invention is concerned. I do not wish to limit myself to door stopping, however, for it is equally adapted to the manufacture of other types of molding.

In the manufacture of wooden doors, however, I have also discovered that short lengths of rails $r$ and stiles $s$, which were formerly thrown away and considered scrap, may be utilized to manufacture said door stops. It is impracticable to run short strips through a "sticker," which is the accepted machine for forming strips, in lengths less than 3½ or 4 feet, and thus short-lengths of material from 1½ to 2 feet long were impracticable to be utilized and thus were thrown away.

By my improved method, by which the strips of material are formed upon one edge of a block of material, there is no minimum limit to the length of the block, and for this reason blocks may be cut to the desired length before they are otherwise formed, because the gripping devices for said block may obtain an adequate purchase upon the remainder of the block without being required to grip the strips themselves, and thus these fragile and easily marred pieces of material can be operated upon without difficulty as long as they constitute an integral portion of the block of material.

I claim:

1. In woodworking, the method of forming door stops consisting of coping one end of a block of material of predetermined length, then profiling one surface of said block, while gripping the remainder, said profile matching the design of the coping and lastly severing a strip carrying the profiled edge, thus formed, from the remainder of said block, thereby forming said strip while an integral portion of said block, which latter thus serves as a support or holder for said strip.

2. In the manufacture of wooden doors and the like, the method of utilizing stile and rail trimmings for making stops therefor, consisting in, cutting said trimmings to predetermined length, and forming the ends thereof, then profiling one of the edges thereof, to outline two formed stops arranged side by side, upon said edge, severing said stops from each other and from the remainder of the block by making two cuts in said block at right angles to each other and normal to the profiled edge and the sides, respectively, of the trimmings.

3. In woodworking, the method of forming strips of profiled material, having shaped ends, from a block of material of sufficient size that a plurality of strips may be cut therefrom, consisting in cutting the latter to a predetermined length, coping one of the ends of said block and profiling one of the edges thereof to outline a plurality of strips arranged side by side on said edge, then severing said strips from each other and from the remainder of the block, whereby, all of the surfacing, forming and cutting operations are performed upon said strips, while constituting an integral portion of the block and thus while supported by the latter.

4. In woodworking, the method of forming molding strips and the like from a block of material of sufficient size that a plurality of strips may be cut therefrom, consisting in cutting said block to the desired length and finishing the ends thereof, then profiling one of the edges thereof to outline a plurality of strips arranged side by side on said edge, then separating such strips from each other by a slot of substantially greater depth than the thickness of said strips and finally severing such strips from the remainder of the block by forming a saw kerf normal to and intersecting such slot, and entirely across the unsevered portion of said strips.

JOHN C. DE PENNING.